(12) United States Patent
Lin et al.

(10) Patent No.: US 9,800,398 B2
(45) Date of Patent: Oct. 24, 2017

(54) APPARATUS AND METHOD FOR TRANSMITTING AND RECEIVING DATA

(71) Applicant: MEDIATEK INC., Hsin-Chu (TW)

(72) Inventors: Chu-Ming Lin, Hsinchu (TW);
Hsuan-Jung Hsu, Hsinchu (TW);
Cheng-Yueh Hsiao, Nantou County (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/564,092

(22) Filed: Dec. 9, 2014

(65) Prior Publication Data
US 2016/0164661 A1 Jun. 9, 2016

(51) Int. Cl.
*H04L 7/00* (2006.01)
*H04B 1/40* (2015.01)

(52) U.S. Cl.
CPC ............. *H04L 7/0012* (2013.01); *H04B 1/40* (2013.01)

(58) Field of Classification Search
CPC ...... H04L 27/15661; H04L 7/00; G06F 3/061
USPC ........................... 375/355; 711/154; 709/217
See application file for complete search history.

(56) References Cited

U.S. PATENT DOCUMENTS

| | | | | |
|---|---|---|---|---|
| 6,226,723 B1* | 5/2001 | Gustavson | ............... | G11C 7/10 711/154 |
| 2006/0095693 A1* | 5/2006 | Aida | ..................... | G06F 3/0613 711/154 |
| 2007/0299929 A1* | 12/2007 | Nielsen | ................. | G06F 13/387 709/217 |
| 2010/0169699 A1* | 7/2010 | Fujimoto | ............ | G06F 13/4291 713/503 |

\* cited by examiner

*Primary Examiner* — Daniel Washburn
*Assistant Examiner* — Fitwi Hailegiorgis
(74) *Attorney, Agent, or Firm* — Oblon, McClelland, Maier & Neustadt, L.L.P.

(57) ABSTRACT

A data transceiving system, comprising: a data receiving apparatus, comprising a data receiving side command pin and at least one data receiving side data pin; a data transmitting apparatus, comprising a data transmitting side command pin and at least one data transmitting side data pin. The data receiving apparatus transmits a first command signal from the data receiving side command pin to the data transmitting side command pin, and the data transmitting apparatus transmits a first response signal from the data transmitting side command pin to the data receiving side command pin. The data transmitting apparatus transmits data from the data transmitting side data pin to the data receiving side data pin. The data transmitting apparatus transmits a first data sampling clock signal from the data transmitting side command pin to the data receiving side command pin, to sample the data.

18 Claims, 7 Drawing Sheets

APPARATUS AND METHOD FOR TRANSMITTING AND RECEIVING DATA

BACKGROUND

Conventionally, if a data receiving apparatus needs data from a data transmitting apparatus, the data receiving apparatus always transmits a command signal firstly and then the data transmitting apparatus transmits data to the data receiving apparatus responding to the command signal. The operations for the data receiving apparatus and the data transmitting apparatus need to be synchronized, or the data maybe wrongly transmitted or wrongly sampled.

FIG. 1 is a block diagram illustrating a data transceiving system, which applies a common clock scheme, for related art. As shown in FIG. 1, the data transceiving system 100 comprises a data receiving apparatus 101 and a data transmitting apparatus 103. The data receiving apparatus 101 receives a common clock signal CCLK from the clock source 105 via a clock pin CP_1 and the data transmitting apparatus 103 receives the common clock signal CCLK from the clock source 105 via the clock pin CP_2. By this way, the data transmitting apparatus 103 outputs the data DA from the data pin DP_2 to the data pin DP_1 based on the common clock signal CCLK, and the data receiving apparatus 101 samples the data DA based on the common clock signal CCLK. That is, the data receiving apparatus 101 and a data transmitting apparatus 103 share the common clock signal CCLK to process the data DA.

However, the common clock signal CCLK received by the data receiving apparatus 101 and the data transmitting apparatus 103 may have phase skew due to the latency caused by transmitting path. Such issue becomes more serious if the data transceiving system operates at a high speed. Furthermore, if the data transmitting apparatus 103 is an I/O (input/output) apparatus, such scheme will limit the bandwidth of the data transmitting apparatus 103.

FIG. 2 is a block diagram illustrating a data transceiving system 200, which applies a source clock scheme, for related art. As illustrated in FIG. 2, the data receiving apparatus 201 and the data transmitting apparatus 203 for the data transceiving system 200 do not share a common clock signal to process data. The data receiving apparatus 201 transmits a master clock signal MCLK from a clock pin CP_11 thereof to a clock pin CP_21 of the data transmitting apparatus 203. The master clock signal MCLK is applied to operations other than processing the data DA. For example, the data receiving apparatus 201 outputs a command signal CMD from a command pin CMP_1 thereof to a command pin CMP_2 of the data transmitting apparatus 203 based on the master clock signal MCLK.

The data transmitting apparatus 203 outputs a data sampling clock signal SCLK from a clock pin CP_22 thereof to a clock pin CP_12 of the data receiving apparatus 201. The data transmitting apparatus 203 outputs data DA from a data pin DP_2 thereof to a data pin DP_1 of the data receiving apparatus 201 based on the data sampling clock signal SCLK, and the data receiving apparatus 201 samples data DA based on the data sampling clock signal SCLK. However, either the data receiving apparatus 201 or the data transmitting apparatus 203 needs an extra clock pin (i.e. clock pins CP_12, CP_22) for such scheme.

SUMMARY

Therefore, one objective of the present application is to provide a data transceiving system, a data receiving apparatus and a data transmitting apparatus that need no extra clock pin.

Another objective of the present application is to provide a data receiving method and a data transmitting method that need no extra clock pin.

One embodiment of the present application discloses a data receiving apparatus with a data receiving side command pin and at least one data receiving side data pin. The data receiving side command pin outputs a first command signal, receives a first response signal corresponding to the first command signal, and receiving a first data sampling clock signal. The data receiving side data pin receives data after the data receiving side command pin receives the first response signal. The data receiving apparatus applies the first data sampling clock signal to sample the data.

Another embodiment of the present application discloses a data transmitting apparatus with a data transmitting side command pin and at least one data transmitting side data pin. The data transmitting side command pin receives a first command signal, outputs a first response signal corresponding to the first command signal, and outputs a first data sampling clock signal, wherein the first data sampling clock signal is applied to sample the data. The data transmitting side data pin outputs data after the data transmitting side command pin outputting the first response signal.

The above mentioned data transmitting apparatus and data receiving apparatus can be combined to form a data transceiving system. The details of the data transceiving system can be acquired based on above-mentioned embodiments, thus are omitted for brevity here.

A data receiving method and a data transmitting method can be acquired in view of the above-mentioned embodiments. The steps can be easily understood based on above-mentioned embodiments, thus are omitted for brevity here.

In view of above-mentioned embodiments, the data sampling clock signal can be transmitted by the command pin of the data transmitting apparatus and the data receiving apparatus, thus no extra clock pin is needed.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
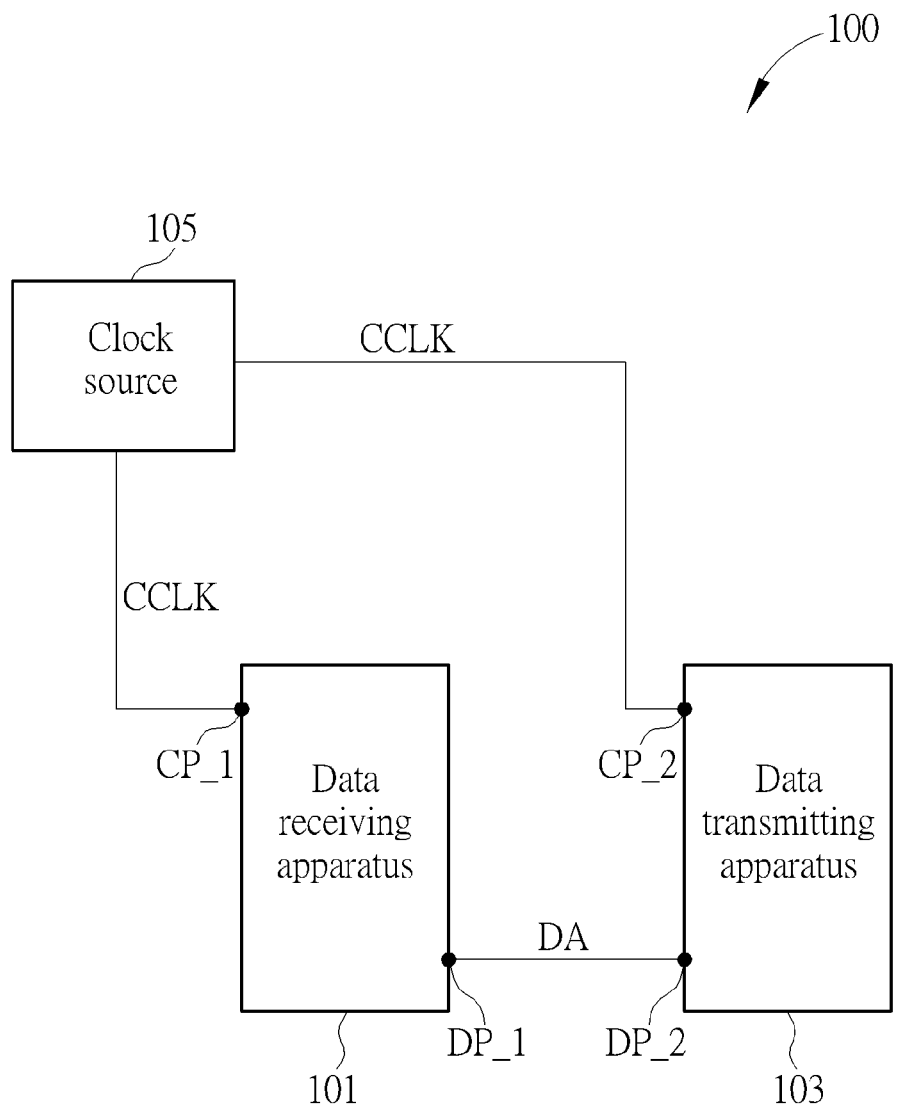
FIG. 1 is a block diagram illustrating a data transceiving system, which applies a common clock scheme, for related art.
Figure 2:
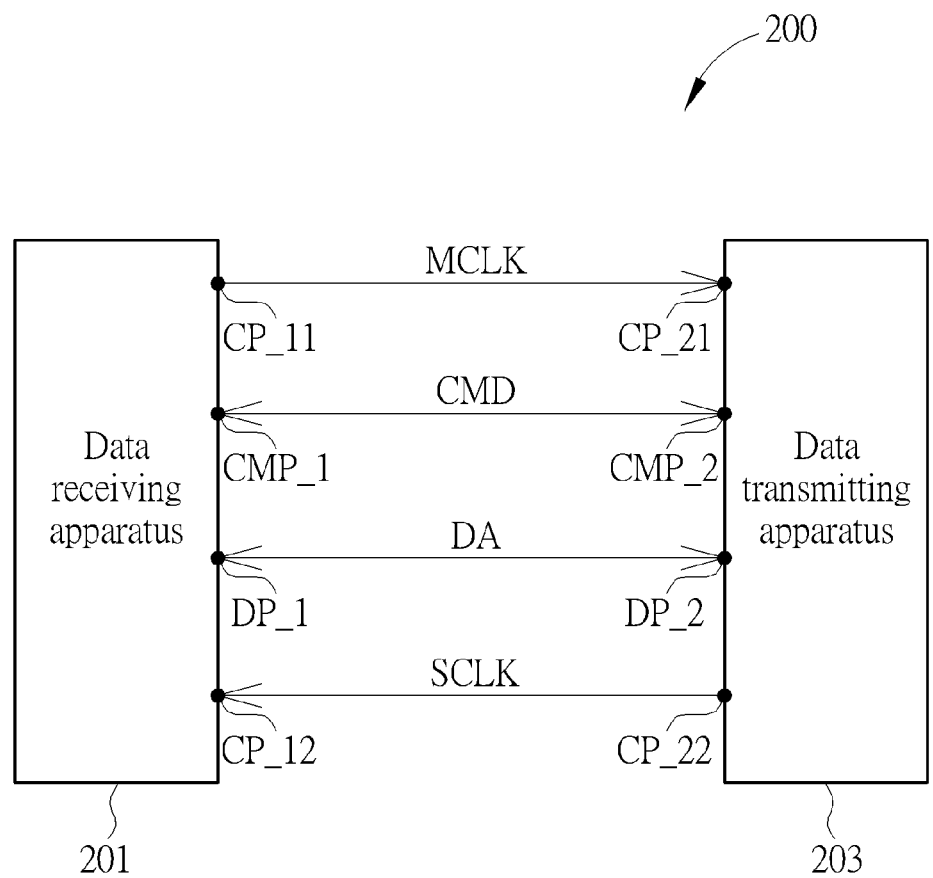
FIG. 2 is a block diagram illustrating a data transceiving system, which applies a source clock scheme, for related art.
Figure 3:
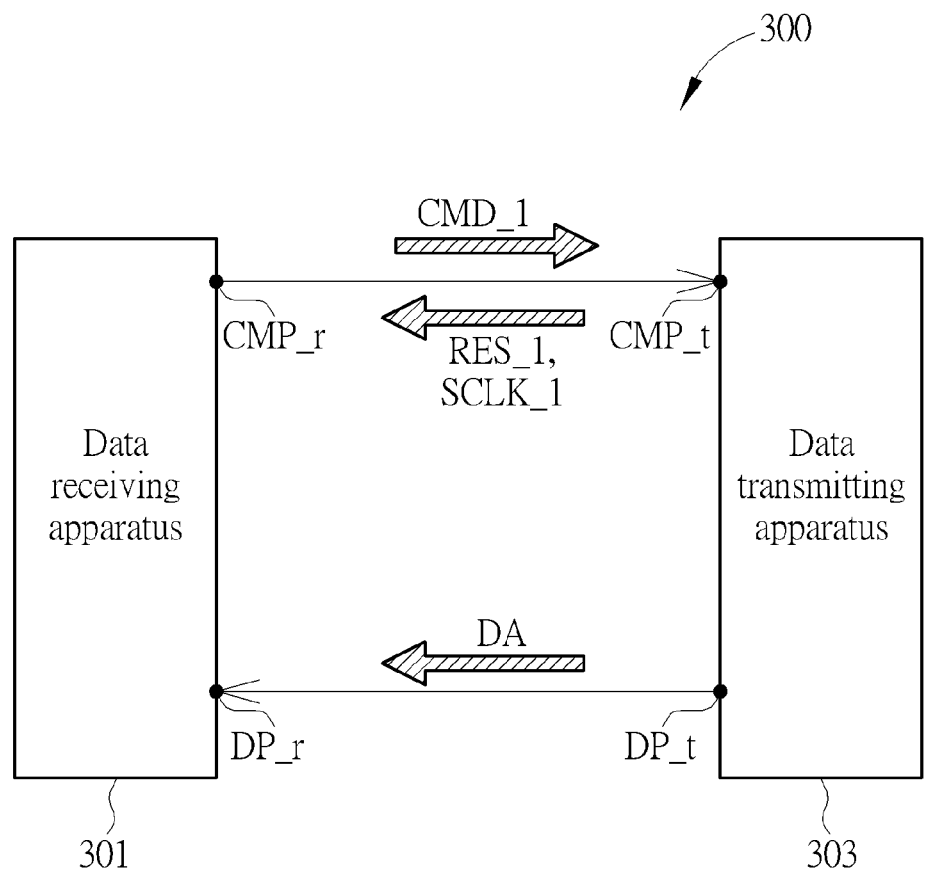
FIG. 3 is a block diagram illustrating a data transceiving system according to one embodiment of the present application.

FIG. 3 is a block diagram illustrating a data transceiving system according to one embodiment of the present application. As illustrated in FIG. 3, the data transceiving system 300 comprises a data receiving apparatus 301 and a data transmitting apparatus 303. The data receiving apparatus 301 is, for example, a smart phone, a card reader, a tablet computer or a camera. The data transmitting apparatus 303 is, for example, an interface device such as a SDIO (secure digital input/output) card, a wireless connectivity device such as a WiFi card or a LTE card, or a storage device such as a SD (secure digital) card. To be specific, the data transmitting apparatus 303 may be any device that has a SDIO interface module. The data transmitting apparatus 303 may be an external device which is not housed inside the data receiving apparatus 301. Alternatively the data transmitting apparatus 303 may be mounted on the motherboard of the data receiving apparatus 301. Please note the data receiving apparatus 301 and the data transmitting apparatus 303 are not limited to these examples.

The data receiving apparatus 301 comprises a data receiving side command pin CMP_r and at least one data receiving side data pin (only one data receiving side data pin DP_r is shown in following embodiments). The data receiving side command pin CMP_r outputs a first command signal CMD_1, receives a first response signal RES_1 corresponding to the first command signal CMD_1, and receives a first data sampling clock signal SCLK_1. In one embodiment, the first data sampling clock signal SCLK_1 is received after receives the first response signal RES_1. The data receiving side data pin DP_r receives data DA after the data receiving side command pin CMP_r receives the first response signal RES_1. The data receiving apparatus 301 applies the first data sampling clock signal SCLK_1 to sample the data DA.

The data transmitting apparatus 303 comprises a data transmitting side command pin CMP_t and at least one data transmitting side data pin (only one data transmitting side data pin DP_t is illustrated in this example). The data transmitting side command pin CMP_t receives the first command signal CMD_1, outputs the first response signal RES_1 and outputs the first data sampling clock signal SCLK_1. The data transmitting side data pin DP_t outputs the data DA.

Figure 4:
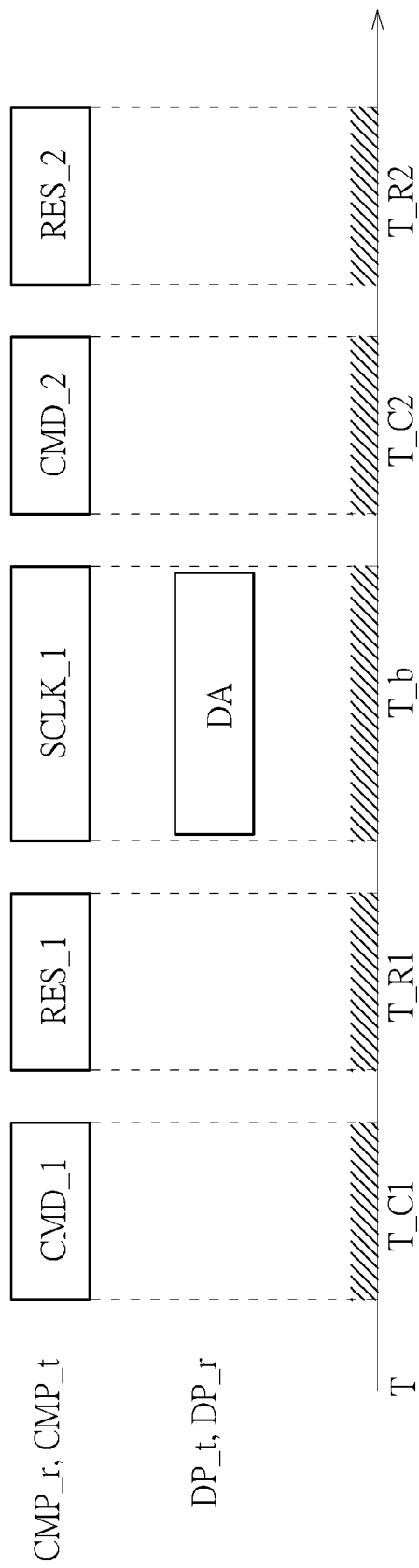
FIG. 4 is a schematic diagram illustrating one example of the operation for the embodiment depicted in FIG. 3.

FIG. 4 is a schematic diagram illustrating one example of the operation for the embodiment depicted in FIG. 3. As illustrated in FIG. 4, the first command signal CMD_1 (e.g., a read command signal), the first response signal RES_1 and the first data sampling clock signal SCLK_1 are transmitted between the data receiving side command pin CMP_r and the data transmitting side command pin CMP_t. Also, the data DA is transmitted between the data receiving side data pin DP_r and the data transmitting side data pin DP_t.

In one embodiment, the data transmitting apparatus 303 outputs the first data sampling clock signal SCLK_1 while outputting the data DA. That is, the data transmitting apparatus 303 transfers the data DA to the data receiving apparatus 301 based on the first data sampling clock signal SCLK_1, where the first data sampling clock signal SCLK_1 may be regarded as a reference clock signal or a data strobe signal. It would be appreciated that the data transmitting apparatus 303 outputs the first data sampling clock signal SCLK_1 in a blank time period T_b, in which no commands signals and no response signals are transmitted between the data receiving side command pin CMP_r and the data transmitting side command pin CMP_t. To be specific, since during the blank time period T_b, the data transmitting apparatus 303 is going to transmit the first data sampling clock signal SCLK_1 via the connection between the data transmitting side command pin CMP_t and the data receiving side command pin CMP_r, the data receiving apparatus 301 is incapable of sending other commands (e.g., the direct command) through the data receiving side command pin CMP_r during the data read operation. Only if the current data read operation is completed, the data receiving apparatus 301 may send out another command signal via the data receiving side command pin CMP_r. For example, as shown in FIG. 4, the data receiving apparatus 301 further outputs a second command signal CMD_2 after the current data read operation is completed. In this case, a time period between a time period T_R1 for transmitting the first response signal RES_1 and a time period T_C2 for transmitting the second command signal CMD_2 is regarded as the blank time period T_b. However, these embodiments are only for examples and do not mean to limit the scope of the present application. The timing for transmitting the first data sampling clock signal SCLK_1 between the data receiving side command pin CMP_r and the data transmitting side command pin CMP_t can be varied based on the content disclosed by the present application.

In one embodiment, as shown in FIG. 4, the period for transmitting data is inside the blank time period T_b. Also, the period for transmitting data is smaller or equals to the blank time period T_b.

In view of above-mentioned embodiments, a data transceiving system provided by the present application can be summarized as: a data transceiving system (e.g., 300) comprising: a data receiving apparatus (e.g., 301) comprising a data receiving side command pin (e.g., CMP_r) and at least one data receiving side data pin (e.g., DP_r); a data transmitting apparatus (e.g. 303), comprising a data transmitting side command pin (e.g., CMP_t) and at least one data transmitting side data pin (e.g., DP_t). The data receiving apparatus transmits a first command signal (e.g., CMD_1) from the data receiving side command pin to the data transmitting side command pin, and the data transmitting apparatus transmits a first response signal (e.g., RES_1) corresponding to the first command signal from the data transmitting side command pin to the data receiving side command pin after receives the first command signal. The data transmitting apparatus transmits data (e.g., data) from the data transmitting side data pin to the data receiving side data pin after the data receiving apparatus receives the first response signal. The data transmitting apparatus transmits a first data sampling clock signal (e.g., SCLK_1) from the data transmitting side command pin to the data receiving side command pin. The data receiving apparatus applies the first data sampling clock signal to sample the data.

Please note the data receiving apparatus 301 and the data transmitting apparatus 303 are not limited to be cooperated with each other. The data receiving apparatus 301 or the data transmitting apparatus 303 can be applied to other circuits independently.

Accordingly, a data receiving apparatus provided by the present application can be summarized as: a data receiving apparatus, comprising: a data receiving side command pin (e.g., CMP_r), for outputting a first command signal (e.g., CMD_1), for receiving a first response signal (e.g., RES_1) corresponding to the first command signal, and for receiving a first data sampling clock signal (e.g., SCLK_1); and at least one data receiving side data pin (e.g., DP_r), for receiving data (e.g., DA) after the data receiving side command pin receives the first response signal. The data receiving apparatus applies the first data sampling clock signal to sample the data.

Also, the data transmitting apparatus provided by the present application can be summarized as: a data transmitting apparatus, comprising: a data transmitting side command pin (e.g., CMP_t), for receiving a first command signal (e.g., CMD_1), for outputting a first response signal (e.g., RES_1) corresponding to the first command signal, and for outputting a first data sampling clock signal (e.g., SCLK_1), which is applied to sample the data; and at least one data transmitting side data pin (e.g., DP_t), for outputting data (e.g., DA) after the data transmitting side command pin outputting the first response signal.

Figure 5:
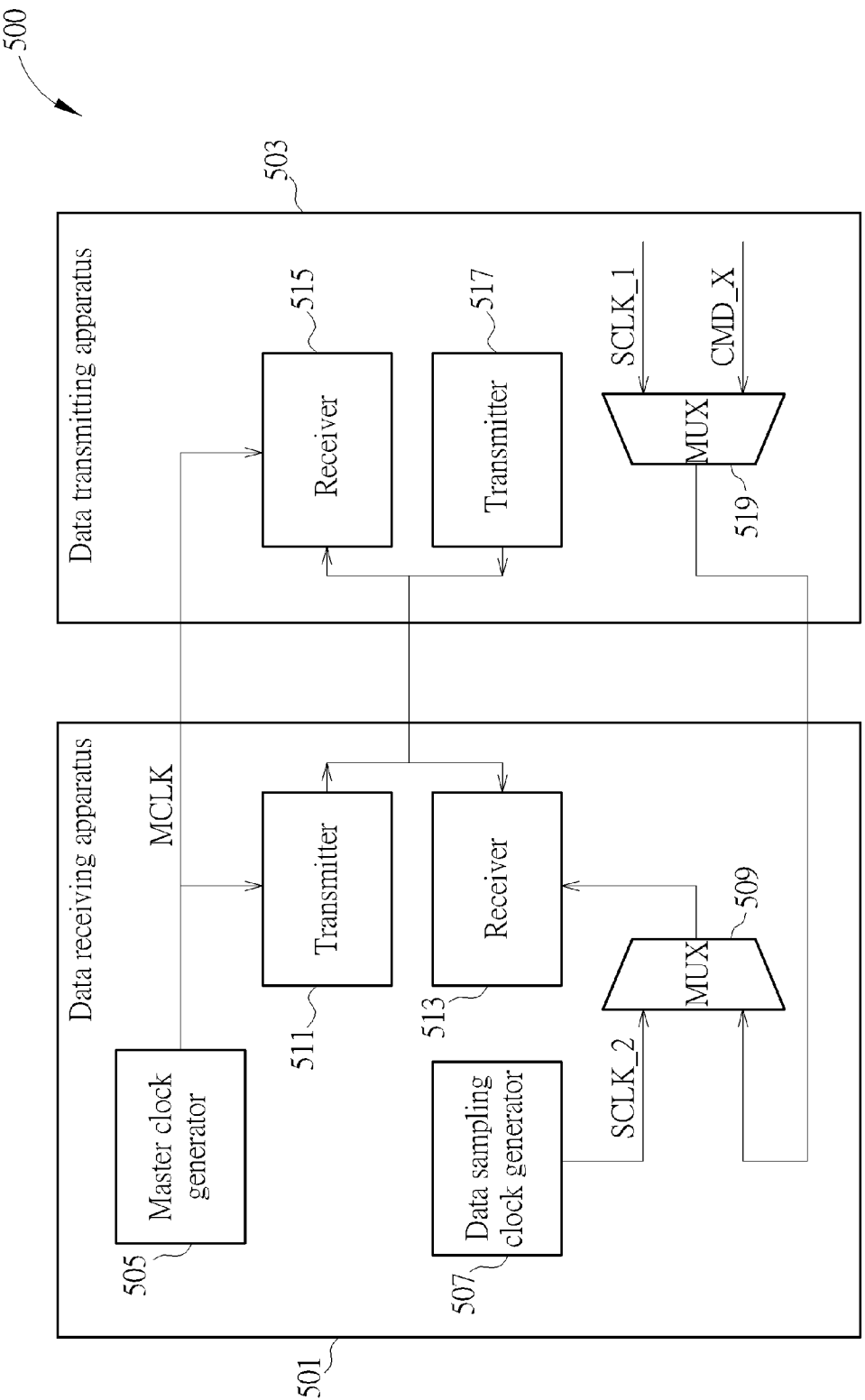
FIG. 5 is a block diagram illustrating one example of a detailed structure for the embodiment depicted in FIG. 3.

FIG. 5 is a block diagram illustrating one example of a detailed structure for the embodiment depicted in FIG. 3. The data transceiving system 500 comprises a data receiving apparatus 501 and a data transmitting apparatus 503. The data receiving apparatus 501 comprises a master clock generator 505, a data sampling clock generator 507, a multiplexer 509, a transmitter 511 and a receiver 513. The data transmitting apparatus 503 comprises a receiver 515, a transmitter 517 and a multiplexer 519. The master clock generator 505 generates the master clock signal MCLK, such that the transmitter 511 and the receiver 515 operate based on the master clock signal MCLK. However, the master clock generator 505 is optional and is not limited to be included in the data transceiving system of the present application.

The transmitter 511 outputs signals to the receiver 515. For example, the transmitter 511 outputs the above-mentioned command signals to the receiver 515. The receiver 513 receives the data from the transmitter 517 and samples the data based on the first data sampling clock signal SCLK_1 or the second data sampling clock signal SCLK_2, in which the first data sampling clock signal SCLK_1 is transmitted from the data transmitting apparatus 503 and the second data sampling clock signal SCLK_2 is generated by the data sampling clock generator 507. The receiver 513 can receive other output from the transmitter 517, such as response signals. The multiplexer 509 outputs the second data sampling clock signal SCLK_2 or the output from the multiplexer 519 to the receiver 513. The multiplexer 519 outputs the first data sampling clock signal SCLK_1 or other signals such as command signals or response signals (in this example, a command signal CMD_x) to the multiplexer 509.

In one embodiment, the data transceiving system 500 can operate in a first mode (or named an advanced mode) and a second mode (or named a normal mode). In the first mode, the multiplexer 519 outputs the first data sampling clock signal SCLK_1 to the multiplexer 509, and the multiplexer 509 outputs the first data sampling clock signal SCLK_1 to the receiver 513. The receiver 513 samples the data based on the first data sampling clock signal SCLK_1 in the first mode. In the second mode, the multiplexer 519 outputs the command signal CMD_x to the data receiving apparatus 501 and the multiplexer 509 outputs the second data sampling clock signal SCLK_2 to the receiver 513. The receiver 513 samples the data based on the second data sampling clock signal SCLK_2 in the second mode.

Many methods can be applied to determine which mode the data transceiving system 500 should operate in. For example, it is firstly determined if both the data receiving apparatus 501 and the data transmitting apparatus 503 have the capability to operate at the first data sampling clock signal SCLK_1. If yes, the data transceiving system 500 operates in the first mode (the advanced mode). If not, the data transceiving system 500 operates in the second mode (the normal mode).

Following such rule, in one embodiment, the data receiving apparatus 501 is a host apparatus can operate at the first data sampling clock signal SCLK_1, and firstly checks if the data transmitting apparatus 503 can operate at the first data sampling clock signal SCLK_1 before the data transmitting apparatus 503 transmits data. For example, the data transmitting apparatus 503 stores a status bit therein, and the data receiving apparatus 501 reads the status bit to determine if the data transmitting apparatus 503 has the capability to operate at the first data sampling clock signal SCLK_1. If yes, the data transceiving system 500 operates in the first mode (the advanced mode). If not, the data transceiving system 500 operates in the second mode (the normal mode). By this way, the data transceiving system 500 can correspond to different data transmitting apparatus 503 to operate in the first mode or in the second mode.

It will be appreciated that the method for selecting the mode that the data transceiving system 500 operates in is not limited to above-mentioned examples.

Figure 6:
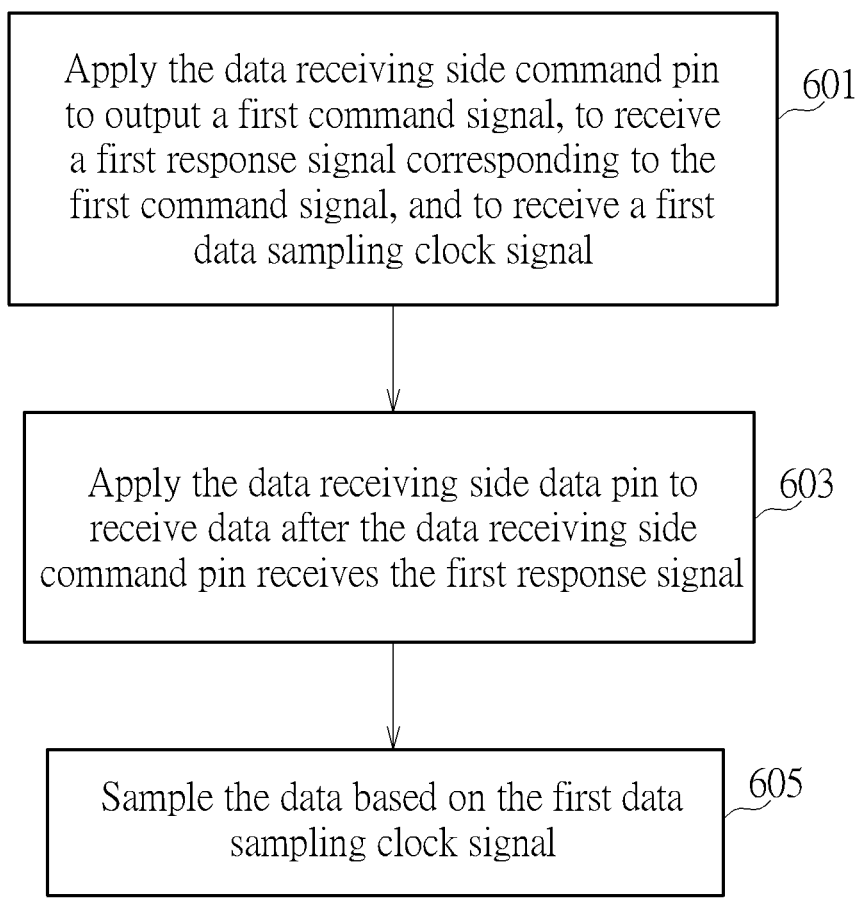
FIG. 6 is a flow chart illustrating a data receiving method according to one embodiment of the present application.

In view of above mentioned embodiments, a data receiving method and a data transmitting method can be acquired. As illustrated in FIG. 6, the data receiving method, which is applied to a data receiving apparatus (e.g., 301 in FIG. 3) with a data receiving side command pin and at least one data receiving side data pin comprises:

Step 601

Apply the data receiving side command pin (e.g., CMP_r) to output a first command signal (e.g., CMD_1), to receive a first response signal (e.g., RES_1) corresponding to the first command signal, and to receive a first data sampling clock signal (e.g., SCLK1).

Step 603

Apply the data receiving side data pin (e.g., DP_r) to receive data (e.g., DA) after the data receiving side command pin receives the first response signal.

Step 605

Sample the data based on the first data sampling clock signal.

Figure 7:
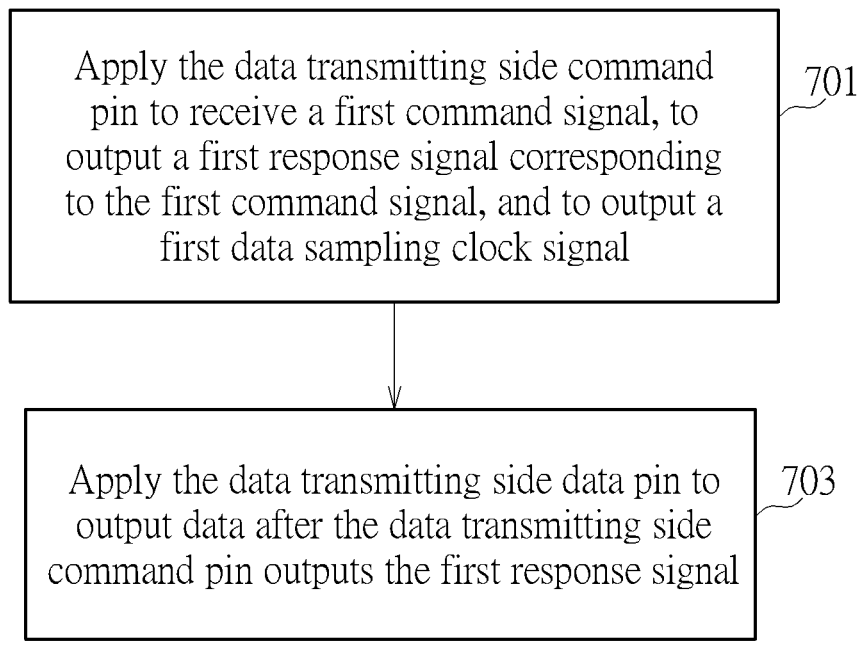
FIG. 7 is a flow chart illustrating a data transmitting method according to one embodiment of the present application.

As illustrated in FIG. 7, the data transmitting method, which is applied to a data transmitting apparatus (e.g., 303 in FIG. 3) with a data transmitting side command pin and at least one data transmitting side data pin comprises:

Step 701

Apply the data transmitting side command pin (e.g., CMP_t) to receive a first command signal (e.g., CMD_1), to output a first response signal (e.g., RES_1) corresponding to the first command signal, and to output a first data sampling clock signal (e.g., SCLK_1).

Step 703

Apply the data transmitting side data pin (e.g., DP_t) to output data (e.g., DA) after the data transmitting side command pin outputs the first response signal.

If the steps in FIG. 6 and FIG. 7 are combined, a data transceiving can be acquired.

In view of above-mentioned embodiments, the data sampling clock signal can be transmitted by the command pin of the data transmitting apparatus and the data receiving apparatus, thus no extra clock pin is needed.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A data receiving apparatus, comprising:
a data receiving side command pin;
at least one data receiving side data pin; and
circuitry configured to:
output a first command signal and receive a first response signal corresponding to the first command signal through the data receiving side command pin during a first time period;

receive a first data sampling clock signal through the data receiving side command pin during a second time period that is after the first time period;

receive data through the at least one data receiving side data pin during the second time period; and apply the first data sampling clock signal to sample the data.

2. The data receiving apparatus of claim 1, wherein the circuitry receives, via the data receiving side command pin, the first data sampling clock signal while the circuitry receives, via the at least one data receiving side data pin, the data.

3. The data receiving apparatus of claim 1, wherein during a blank time period that the data receiving apparatus receives the first data sampling clock signal, the data receiving apparatus is incapable of transmitting any command signal via the data receiving side command pin.

4. The data receiving apparatus of claim 3, wherein the circuitry is further configured to output a second command signal via the data receiving side command pin after the blank time period.

5. The data receiving apparatus of claim 1, wherein the circuitry comprises:
   a receiver, for receiving the data;
   a second data sampling clock signal generator, for generating a second sampling clock signal; and
   a multiplexer, for receiving the first data sampling clock signal and the second data sampling clock signal, for outputting the first data sampling clock signal to the receiver in a first mode, and for outputting the second data sampling clock signal to the receiver in a second mode,
   wherein the receiver samples the data based on the first data sampling clock signal in the first mode and samples the data based on the second data sampling clock signal in the second mode.

6. The data receiving apparatus of claim 1, wherein the first response signal corresponding to the first command signal and the first data sampling clock signal are from a device having a secure digital input/output (SDIO) interface module.

7. A data transmitting apparatus, comprising:
   a data transmitting side command pin;
   at least one data transmitting side data pin; and
   circuitry configured to:
      receive a first command signal and output a first response signal corresponding to the first command signal through the data transmitting side command pin during a first time period;
      output data through the at least one data transmitting side data pin during a second time period that is after the first time period; and
      output a first data sampling clock signal, for sampling the data, through the data transmitting side command pin during the second time period.

8. The data transmitting apparatus of claim 7, wherein the circuitry outputs, via the data transmitting side command pin, the first data sampling clock signal while the circuitry outputs, via the at least one data transmitting side data pin, the data.

9. The data transmitting apparatus of claim 7, wherein the data transmitting apparatus receives no command signal via the data transmitting side command pin within a time period that the data transmitting apparatus transmits the first data sampling clock signal.

10. The data transmitting apparatus of claim 7 wherein the data transmitting apparatus is a device having a secure digital input/output (SDIO) interface module.

11. A data transceiving system, comprising:
   a data receiving apparatus, comprising a data receiving side command pin and at least one data receiving side data pin; and
   a data transmitting apparatus, comprising a data transmitting side command pin and at least one data transmitting side data pin;
   wherein, during a first time period, the data receiving apparatus transmits a first command signal from the data receiving side command pin to the data transmitting side command pin, and the data transmitting apparatus transmits a first response signal corresponding to the first command signal from the data transmitting side command pin to the data receiving side command pin after receives the first command signal;
   wherein, during a second time period that is after the first time period, the data transmitting apparatus transmits data from the at least one data transmitting side data pin to the at least one data receiving side data pin after the data receiving apparatus receives the first response signal; and
   wherein, during the second time period, the data transmitting apparatus transmits a first data sampling clock signal from the data transmitting side command pin to the data receiving side command pin, and the data receiving apparatus applies the first data sampling clock signal to sample the data.

12. The data transceiving system of claim 11, wherein the data transmitting apparatus transmits the first data sampling clock signal while the data transmitting apparatus transmits the data.

13. The data transceiving system of claim 11, wherein the data receiving apparatus further transmits a second command signal from the data receiving side command pin to the data transmitting side command pin after the data transmitting apparatus transmits the first response signal, wherein the data transmitting apparatus transmits the first data sampling clock signal in a blank time period between a time period for transmitting the first response signal, and a time period for transmitting the second command signal, wherein no signal besides the first data sampling clock signal is transmitted between the data receiving side command pin and the data transmitting side command pin in the blank time period.

14. The data transceiving system of claim 11, further comprising a command line provided between the data receiving side command pin and the data transmitting side command pin, wherein the first command signal, the first response signal, and the first data sampling clock signal are transmitted via the command line.

15. The data transceiving system of claim 11, wherein the data receiving apparatus comprises:
   a receiver, for receiving the data from the data transmitting apparatus;
   a second data sampling clock signal generator, for generating a second sampling clock signal; and
   a multiplexer, for receiving the first data sampling clock signal and the second data sampling clock signal, for outputting the first data sampling clock signal to the receiver in a first mode, and for outputting the second data sampling clock signal to the receiver in a second mode, wherein the receiver samples the data based on the first data sampling clock signal in the first mode and samples the data based on the second data sampling clock signal in the second mode.

16. The data transceiving system of claim 11, wherein the data transmitting apparatus is a device having a secure digital input/output (SDIO) interface module.

17. A data receiving method, applied to a data receiving apparatus with a data receiving side command pin and at least one data receiving side data pin, comprising:
   outputting a first command signal and receiving a first response signal corresponding to the first command signal through the data receiving side command pin during a first time period;
   receiving a first data sampling clock signal through the data receiving side command pin during a second time period that is after the first time period;
   receiving data through the at least one data receiving side data pin during the second time period; and
   sampling the data based on the first data sampling clock signal.

18. A data transmitting method, applied to a data transmitting apparatus with a data transmitting side command pin and at least one data transmitting side data pin, comprising:
   receiving a first command signal and outputting a first response signal corresponding to the first command signal through the data transmitting side command pin during a first time period;
   outputting data through the at least one data transmitting side data pin during a second time period that is after the first time period; and
   outputting a first data sampling clock signal, for sampling the data, through the data transmitting side command pin during the second time period.

\* \* \* \* \*